United States Patent
Raether

[15] 3,664,934
[45] May 23, 1972

[54] PROCESS FOR THE PREPARATION OF AN ALUMINUM SUPPORT FOR PRESENSITIZED PLANOGRAPHIC PRINTING PLATES

[72] Inventor: Siegfried Raether, Idstein/Tannus, Germany

[73] Assignee: Kalle Aktiengesellschaft, Wiesbaden-Biebrich, Germany

[22] Filed: Aug. 24, 1970

[21] Appl. No.: 66,584

Related U.S. Application Data

[60] Continuation-in-part of Ser. No. 753,493, Aug. 19, 1968, abandoned, which is a division of Ser. No. 535,927, Mar. 21, 1966, Pat. No. 3,481,798.

[30] Foreign Application Priority Data

Mar. 23, 1965 Germany..................P 15 46 785.3

[52] U.S. Cl. ............................................................204/58
[51] Int. Cl. ...........................................................C23b 9/02
[58] Field of Search.............................................204/58, 130

[56] References Cited

UNITED STATES PATENTS 3,481,798  12/1969  Raether..................................204/58
3,210,184  10/1965  Uhlig......................................204/58

Primary Examiner—Howard S. Williams
Assistant Examiner—R. L. Andrews
Attorney—James E. Bryan

[57] ABSTRACT

This invention relates to a process for the preparation of an improved bohmite coating on aluminum which comprises treating the aluminum with water at an effective elevated temperature while passing a galvanic electric current of low voltage from the aluminum as one electrode through the water.

9 Claims, 1 Drawing Figure

Patented May 23, 1972 3,664,934
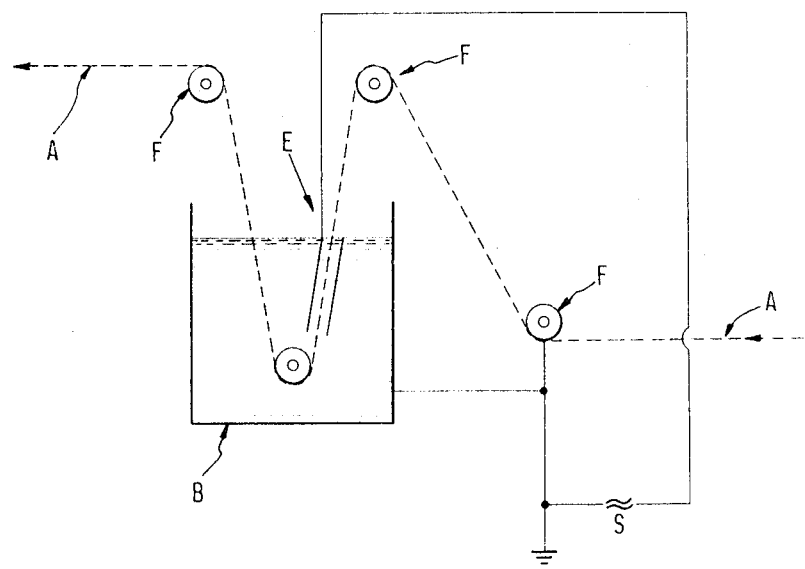
INVENTOR
SIEGFRIED RAETHER
BY Bryan and Bertram
ATTORNEYS

PROCESS FOR THE PREPARATION OF AN ALUMINUM SUPPORT FOR PRESENSITIZED PLANOGRAPHIC PRINTING PLATES

CROSS-REFERENCES TO RELATED APPLICATIONS

This application is a continuation-in-part of copending application Ser. No. 753,493, filed Aug. 19, 1968 and now abandoned, which, in turn, is a division of application Ser. No. 535,927 filed Mar. 21, 1966 and now U.S. Pat. No. 3,481,798.

BACKGROUND OF THE INVENTION

U.S. Pat. No. 3,210,184 relates to presensitized planographic printing plates comprising an aluminum support and a reproduction coating thereon, in which, between the reproduction coating and the aluminum support, there is a boehmite coating produced by the action of water or aqueous-alkaline solutions at elevated temperatures.

In the known production of boehmite by reaction between aluminum and water or steam, particularly at temperatures between 70° and 100° C., at the beginning of the reaction the aluminum hydroxide layer which is formed in the atmosphere and which is always present on aluminum is first converted into boehmite by absorption of water. The actual reaction between the water and the aluminum, with the evolution of hydrogen, then follows. This evolution of gas is important for the formation of a coarse structure in the boehmite, a structure which permits the penetration of water through the coating to the metal surface, also in the case of increasing thickness of coating.

The formation of a coarse structure in the boehmite also depends on the reaction time. The more rapidly the reaction begins and proceeds, the coarser is the macrostructure of the boehmite formed, and the less soiled the surface of the aluminum or aluminum hydroxide exterior layer, the more rapidly does the action of the water begin. The formation of a uniform boehmite coating on aluminum surfaces soiled in places (for example, the surfaces of strips of aluminum are always soiled) is therefore not possible. Also, after the use of additional cleaning processes, for example after rolling, non-uniform formation of boehmite frequently results since the cleaned aluminum surfaces are extraordinarily sensitive and readily absorb greases and oils, also from the gas phase. Trouble of this kind during the formation of the boehmite often can be discerned as grey streaks or spots on the surface of the aluminum.

In order to avoid these defects, generally alkaline-reacting chemicals have been added to the water. However, these additives not only facilitate the elimination of the impurities during the formation of the boehmite, but also have a detrimental effect on the coarse structure of the metal surface and of the boehmite layer and are not be to used in all cases. With increasing pH-value, the cleaning effect increases but the corrosion of the aluminum also becomes greater. The corroding additives are therefore consumed during the formation of the boehmite. They must be continuously replenished and the corrosion products removed from the reaction solution.

SUMMARY OF THE INVENTION

Now it has been found that certain imperfections in the coating, which result during the production of the boehmite coating on the aluminum support, are avoided and an improved aluminum support with a boehmite coating for the presensitized printing plates according to the above patent is obtained by a process constituting the subject matter of this invention. In the process of the invention, the production of the boehmite coating is effected by the action of water at elevated temperature, i.e. of 70° to 100° C., with the application of a galvanic current of low direct current voltages or alternating current voltages from the aluminum as one electrode through the hot water to a second electrode.

This invention provides a possibility for improving the boehmite coating and for increasing the uniformity thereof. The unsoiled areas of the aluminum surface are blocked by electrical means, in order to delay the commencement of the reaction in such areas and to approximate it to the other areas of the surface (the soiled areas). The delay is effected by small electric currents during the formation of the boehmite. The current density in the case of low voltages, i.e. of 3 to 42 volts, has a top limit set by the low electrical conductivity of the pure, i.e. distilled or deionized, salt-free water employed, and is therefore distinctly different in magnitude from the current densities which occur in the known anodizing processes, the maximum being about 2.5 mA per square centimeter. As, however, current voltages of 5 to 10 volts are preferably employed, the preferred maximum current density is about 1.0 mA per square centimeter. The minimum density should be 0.1 mA per square centimeter. As measurements show, the use of the low galvanic currents also permits an influencing of the size of the pores of the boehmite coatings during the formation of the boehmite. The thickness of the coatings, however, is definitely determined by the chemical reaction, in contrast to the formation of the known anodized coatings in which the thickness of the aluminum oxide coatings depends upon the quantity of current employed.

The invention will be further illustrated by reference to the following specific examples:

EXAMPLE 1

A mechanically de-greased aluminum strip was passed through distilled water at 95° to 98° C. In the bath, two electrodes were arranged at a distance of 1 to 2 cm. from the strip. When a DC voltage of 6 volts was applied, after a short time a current density of approximately 0.1 mA/cm$^2$ was produced, which sufficed for the formation of a boehmite layer free from defects. The strip may be arranged as anode or cathode with equally good results.

In the attached drawing, the operating arrangement is shown schematically. A is the aluminum strip on which the boehmite layer is produced, B is the water container through which the aluminum strip is drawn via the guide rollers F. E is the electrode, and S is the current source. The aluminum strip and the container are grounded.

EXAMPLE 2

The same procedure was followed as in Example 1, but instead of a direct-current voltage, an alternating-current voltage was used. With 5 volts, a current density of about 0.5 mA/cm$^2$ was measured. The appearance of the boehmite coating was satisfactory.

EXAMPLE 3

Aluminum foils of 15$\mu$ thickness were treated in double-distilled water of 95° to 98° C. with and without the application of alternating-current voltage (0.3 mA/cm$^2$), and the structure of the boehmite layers which were formed was investigated by the BET method. In the case of the boehmite coatings produced without the application of an alternating-current voltage, pores with diameters of greatly varying size are present, but with the flow of current the frequency of pores of larger diameter is reduced, and that of pores of smaller diameter, especially those of 20 A, is increased.

It will be obvious to those skilled in the art that many modifications may be made within the scope of the present invention without departing from the spirit thereof, and the invention includes all such modifications.

What is claimed is:

1. A process for the preparation of an improved boehmite coating on aluminum with pure water at a temperature in the range of about 70° to 100° C. while passing a galvanic current of at least 0.1 mA/cm$^2$ from the aluminum as one electrode through the water to a second electrode.

2. A process according to claim 1 in which the current is of 0.1 to 0.5 mA per square centimeter and the voltage between the two electrodes is in the range of 5 to 6 volts.

3. A process according to claim 1 in which the pure water is distilled water.

4. A process according to claim 1 in which the pure water is deionized water.

5. A process according to claim 1 in which the current is in the range of 0.1 to 2.5 mA per square centimeter.

6. A process according to claim 5 in which the current is in the range of 0.1 to 1.0 mA per square centimeter.

7. A process according to claim 5 in which the voltage between the two electrodes is in the range of 3 to 42 volts.

8. A process according to claim 6 in which the voltage between the two electrodes is in the range of 5 to 10 volts.

9. An improved boehmite coating on aluminum produced by treating the aluminum with pure water at a temperature in the range of about 70° to 100° C. while passing a galvanic current in the range of 0.1 to 2.5 mA per square centimeter from the aluminum as one electrode through the water to a second electrode.

* * * * *